April 5, 1932.   J. R. GEORGE   1,852,237
METHOD OF AND APPARATUS FOR PREPARING METAL STOCK FOR USE IN PIPE MAKING
Filed Jan. 30, 1930   2 Sheets-Sheet 1

Inventor
Jerome R George
By Geo. H. Kennedy Jr.
Attorney

April 5, 1932.  J. R. GEORGE  1,852,237
METHOD OF AND APPARATUS FOR PREPARING METAL STOCK FOR USE IN PIPE MAKING
Filed Jan. 30, 1930    2 Sheets-Sheet 2
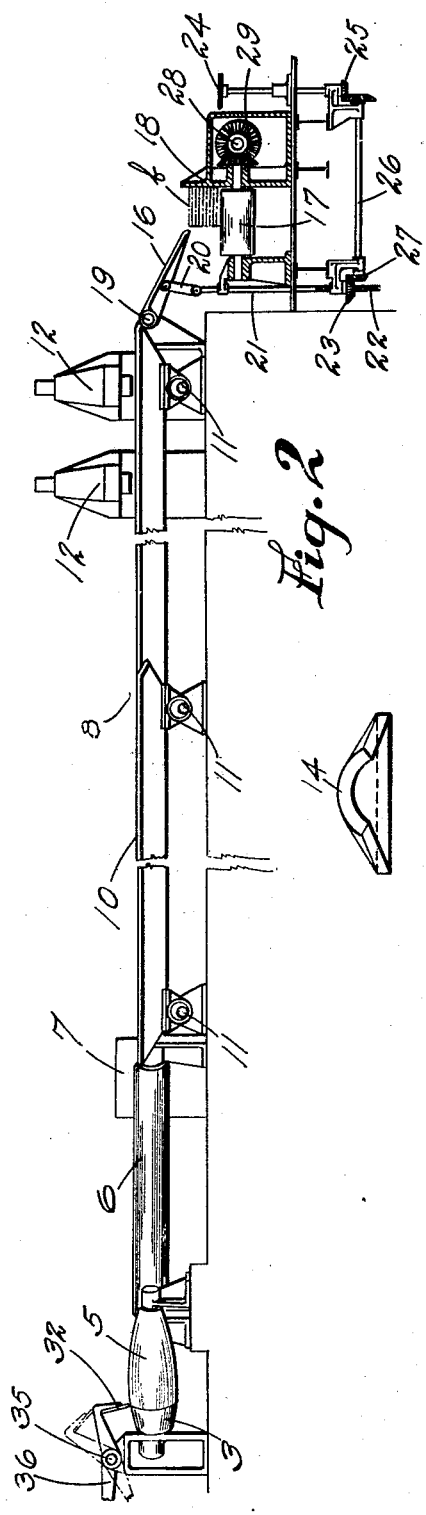
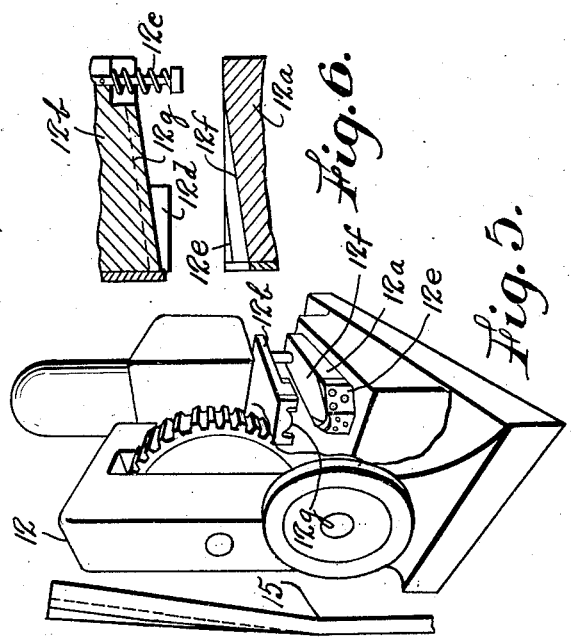
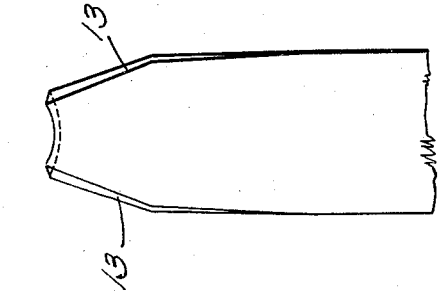
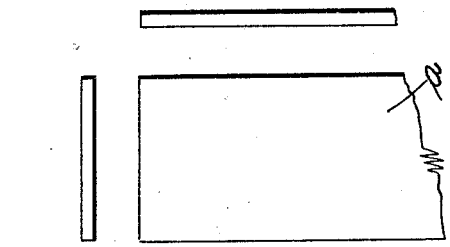
Inventor
Jerome R George
By Geo. H. Kennedy Jr.
Attorney Patented Apr. 5, 1932

1,852,237

UNITED STATES PATENT OFFICE

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

METHOD OF AND APPARATUS FOR PREPARING METAL STOCK FOR USE IN PIPE MAKING

Application filed January 30, 1930. Serial No. 424,602.

The present invention relates to the preparation of the metal stock, known as "skelp", which is used in the manufacture of pipes and tubes,—such stock, as is well known, being rolled in flat elongated strip form and being thereafter curved transversely on a mandrel or in a suitable die, to permit the welding together of its opposite longitudinal edges, for the formation of an elongated pipe or tube.

Before its subjection to the pipe-forming operation as above described, each length of skelp bar must have its front end suitably pointed, cupped and bent, and in the art as now practiced, these operations introduce a very considerable delay in the preparation of the stock and impose the necessity for repeated handlings thereof before it can be reheated for presentation to the pipe-forming instrumentalities. That is to say, according to the usual practice, the skelp bar, upon its delivery from the rolling mill, is cut to the desired lengths in a suitable shear, and then this partially finished product is conveyed to a cooling bed and there piled up flatwise in packs or stacks, for cooling; after such cooling, each piece must be separately removed from its pack and must be individually presented to a special shearing and pressing mechanism which cuts off the corners of each front end, thereby to "point" the piece, and which also cups and bends said front end to the desired form. Then, more hand labor is necessary to reassemble the individual pieces, thus completed, for storage or shipment, or for their introduction to a reheating furnace, preparatory to the actual pipe making operation.

The present invention contemplates a radical departure from the above described procedure, by causing the preparatory operations of pointing, cupping and bending to be performed on the successively-delivered pieces of skelp bar before the latter are assembled in packs or stacks, for cooling; in consequence of this, much time and labor is saved, because the pieces of skelp, as finally assembled in pack formation for cooling are already pointed, cupped and bent, and therefore no disturbance of the packs to permit subsequent individual handling of the pieces is required.

The novel method of my invention by which the above and other advantages are secured, and also the novel combination and arrangement of apparatus employed for carrying out said method, are fully set forth in detail hereinafter,—reference being had in this connection to the accompanying drawings, in which Fig. 1 is a diagrammatic plan view showing apparatus arranged in accordance with my invention.

Fig. 2 is a sectional view, on an enlarged scale, the section being taken substantially on the line 2—2 of Fig. 1.

Fig. 3 is a combined underneath, side, and end view of the front portion of each piece of stock, as presented to the pointing, cupping and bending instrumentalities.

Fig. 4 is a similar view of the stock, after being acted upon by the pointing, cupping and bending instrumentalities.

Fig. 5 is an isometric view, illustrative of a device for performing the pointing, cupping and bending of the stock.

Fig. 6 is a fragmentary sectional view, on an enlarged scale, of the cooperating members of Fig. 5 that effect such pointing, cupping and bending.

Like reference characters refer to like parts in the different figures.

Figure 1:
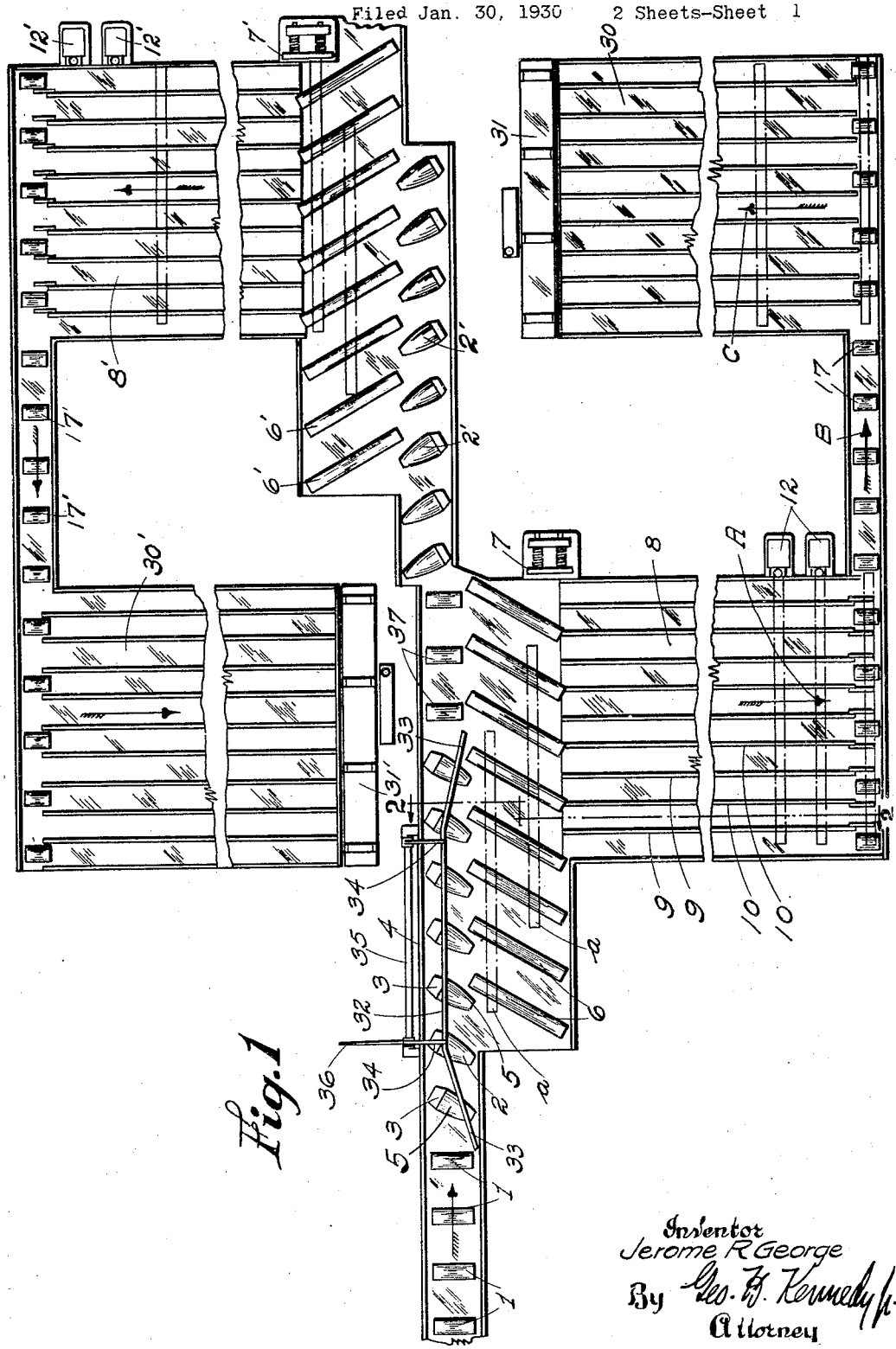

Referring to Fig. 1, I have shown at 1, 1 a series of conveyor rollers, constituting the usual roller table, whereon the pieces of hot skelp bar are run out at high speed,—having been previously cut, upon delivery from the mill, into the desired equal lengths $a$, $a$, by a flying shear, not shown. My invention involves, among other things, the front-end presentation of each of the successively-delivered bars $a$, $a$ to a pointing, cupping and bending mechanism of the usual type, which requires an absolute stoppage of the bar while its operations are being performed. Hence, it is essential first of all that the high velocity of the bars $a$, $a$ as successively delivered by the conveyor rollers 1, 1 be removed, and this removal, on account of the bars being highly heated, must be effected in such a fashion as not to subject said bars to the deformation and bending to which they are highly susceptible.

To this end, the delivery of the bars $a$, $a$ by the conveyor rollers 1, 1 is onto a decelerating table of known type, such, for instance, as that shown and described in Edwards Patent No. 1,587,069, dated June 1, 1926. Said table is constituted, as shown, by a plurality of suitably driven substantially conical rollers 2, 2, whose axes are skewed at an acute angle to the line of delivery from the rollers 1, 1. Each conical roller 2, as shown in Fig. 2, may have its axis substantially horizontal, and in this case its relatively narrow bar-receiving portion 3 is frusto-conical in form and is inclined from the horizontal by an angle somewhat less than the angle of repose of the bars received thereon, so that the latter are initially maintained by gravity in sidewise contact with a side guard 4 of suitable construction. Beyond the receiving portions 3, 3, the rolls 2, 2 provide elongated frusto-conical decelerating portions 5, 5, the latter preferably being surfaces of revolution generated by a curved line of large radius.

Assuming the rollers 1, 1 to be operating at a sufficiently high surface speed to provide suitable end clearance between successive bars $a$, $a$, the receiving portions 3, 3 of the rollers 2, 2 can operate at a somewhat lower surface speed, whereby deceleration, to a certain extent is produced. During such deceleration, involving skidding friction between the roller portions 3, 3 and the bar, the latter maintains its edgewise contact with the side guard 4; however, as the bar through said deceleration finally reaches the surface speed of the roller portions 3, 3, the frictional relation changes from sliding or skidding to static, this involving a material increase in the coefficient of friction, so that the bar in response to the axially skewed disposition of the rollers 2, 2 begins to travel at right angles to the axes of said rollers, being carried up the incline of the receiving surfaces 3, 3 and onto the decelerating portions 5, 5. On said portions 5, 5, the combined broadside and longitudinal movement continues and, owing to the broadside component of such movement, each bar is more and more decelerated, since the surface speed of the series of rollers 2, 2 grows less and less as the bar approaches the smaller ends of the surfaces 5, 5. Such deceleration automatically secures the delivery of the successive bars from the small ends of the rollers 2, 2 in the absence of appreciable velocity, and without having undergone any deformation in the process of removing their original high velocity.

As herein shown, such delivery is preferably made onto a series of slow speed skewed rollers 6, 6, constituting an assembly table whereon the broadside component of the motion of the bars is such that an overlapping relation between them, as shown in Fig. 1, is always maintained. The arrangement of the skewed rollers 6, 6 is such that each bar $a$, by its relatively slight forward travel on said rollers has its front end projected against a suitable bumper 7; the velocity of the bar, however, has been so much reduced in the manner above described that the impact with said bumper is practically negligible. By their contact as above described with the bumper 7, the successive bars $a$, $a$ have their front ends lined up accurately,—this being to facilitate the subsequent proper presentation of said front ends to the pointing, cupping and bending instrumentalities, as hereinafter described. Any suitable means, acting individually or collectively on the bars $a$, $a$ thus lined up at their front ends may be employed to shift them into position for the operation thereon of pointing, cupping and bending devices; I prefer, however, to use for this purpose a well known type of cooling bed 8, adapted for broadside step-by-step movement of successive individual pieces,—the receiving end of said cooling bed being so arranged with relation to the rollers 6, 6 and bumper 7 as to have deposited thereon each successive bar $a$ as the latter, following its front end contact with said bumper, moves broadside off the ends of said rollers.

Said cooling bed 8, as here shown, may consist of a series of alined stationary skids 9, 9, whose supporting surfaces are in substantially the same plane as the upper surfaces of the rollers 6, 6, and an alternating series of movable alined skids 10, 10, the latter, as shown in Fig. 2, being carried by eccentrics 11, 11, so that they partake in parallel, in the well known manner, of a circular motion above and below the stationary skids 9, 9. By this action of the skids 10, 10, each bar $a$, as deposited on the receiving end of the cooling bed 8, is picked up on the skids 10, 10, carried forward a short distance broadside, and then redeposited on the skids 9, 9, this operation being repeated at each revolution of the eccentrics 11, 11, so that a step-by-step broadside traverse of the cooling bed, in the direction of arrow A, Fig. 1, is imparted to each bar $a$, without in any way disturbing the alinement previously imparted to the front ends of said bars.

According to the invention, the lined-up front ends of the successive bars $a$, $a$ are subjected, during the sojourn of said bars on the cooling bed 8, to the action of suitable pointing, cupping and bending devices, shown conventionally at 12, 12 in Figs. 1 and 2. In Figs. 5 and 6, I have shown, by way of example merely, a suitable form of mechanism, corresponding to one of these devices 12,—the same comprising essentially a stationary concave anvil 12$a$ and a cooperating movable convex head 12b, the latter being power-actuated by any suitable means, as shown in Fig. 5. In the step-by-step broadside movement of each bar a across the bed 8, said bar comes to rest temporarily with its front end projected between the anvil 12a and the head 12b, the latter being then in the raised position shown in Fig. 6. While the bar dwells in this position, the device 12 is actuated to produce an operative stroke of the head 12b, which initially causes the interposed bar a to be engaged and clamped by the yieldable gripper 12c. As the head 12b continues to descend, the converging cutters 12d at its inner end, cooperating with similarly arranged cutters 12e on the anvil 12a become effective to slab off the front corners and edges of the bar a, as indicated at 13, 13, Fig. 4; at the same time, said front end is cupped or curved as shown in 14, Fig. 4, by the cooperation of the respective concave and convex pressing surfaces 12f and 12g of the anvil and head. Also, simultaneously, the pointed and cupped front end is bent over, as shown at 15, Fig. 4, out of the horizontal plane occupied by the bar, due to the fact that the cooperating pressure surfaces 12f and 12g are inclined from the horizontal, as shown in Fig. 6.

These operations may, if practicable or desired, be performed by a single mechanism 12 during one period of dwell of the bar on the cooling bed 8, or said operations may be performed partially on one mechanism 12 and partially on an adjacent mechanism 12, the latter adapted to operate during a subsequent period of dwell of the bar on the cooling bed. The particular construction of these pointing, cupping and bending instrumentalities forms, of itself, no part of my invention,—the latter being concerned with the devices 12, 12, which are well known in the art, only as regards the consecutive presentation thereto, in position for operation thereon, of the alined front ends of the bars a, a.

As each bar a, following its partial cooling by passage over the bed 8 and its front end shaping, as above described, reaches the end of said bed 8, it is deposited by the skids 10, 10 on an inclined member 16, Fig. 2, for gravity descent toward a series of conveyor rollers 17, 17, the latter having their axes parallel to the direction of broadside travel of said bar. On said rollers 17, 17, the bars a, a are formed in a pack b, with their forward longitudinal edges bearing against a suitable side guard 18 that extends lengthwise of the series of rollers 17, 17. In order to secure a uniform piling up of the bars a, a into the pack b, the member 16 is preferably made adjustable so as to allow its gradual elevation as the pack b grows higher and higher on the rollers 17, 17. To this end, said member 16 is pivoted to the end of the cooling bed 8, as shown at 19, and has a link connection 20 to a vertically slidable member 21, the latter providing a threaded portion 22 whereon is mounted an internally threaded member 23. The rotation of member 23 secures, by elevation of member 21, the necessary adjustment of inclined member 16 to direct each successive bar a to a higher plane of discharge onto the pack b, so that as the latter builds up in height, each added bar a may be discharged at the proper level. The nut member 23 may be rotated in any suitable manner, as by means of a conveniently placed hand wheel 24, whose shaft has a bevel gear connection 25 with a countershaft 26, the latter carrying a gear 27 that meshes with external gear teeth on the member 23. When a pack b of the desired height has been accumulated on the rollers 17, 17, the rotation of the latter is inaugurated in any suitable way, as by throwing in a clutch or starting a motor, not shown, to drive the common operating shaft 28 that has a bevel gear connection 29 with each of the rollers 17, 17. The pack b is thereby conveyed endwise in the direction of arrow B on said rollers 17, 17 to a point adjacent the receiving end of a pack cooling bed 30, the latter being of any appropriate construction, such, for example, as that adopted for the bed 8, whereby to impart to said pack, as picked off from the rollers 17, 17, a step-by-step broadside movement in the direction of arrow C.

The cooling of the bars a, a is thus proceeded with and completed in the usual pack formation,—with this essential difference however, that said bars before being packed have been pointed, cupped and bent at their front ends so as to require no further operations thereon. In other words, whereas in the usual practice, the packs of bars so cooled have to be broken up to permit each individual bar to be subjected to the pointing, cupping and bending operations,—by my invention, the packs b, b can be left intact, since there is no need for any further operations on the bars that constitute said packs. As said packs are discharged from the cooling bed 30, they can be tied and weighed, on scales 31, in readiness for transportation to any desired destination.

As shown in Fig. 1, it may be desirable, in the event of a large output of the bars a, a being delivered by the roller table 1, 1 from the shear, not shown, to duplicate the entire arrangement of apparatus described above, in order to handle such output satisfactorily. To this end, the decelerating table constituted by the bullet-shaped rollers 2, 2 has associated therewith a suitable switch member in the form of an elongated bar 32, which overlies the rollers 2, 2 substantially at the junctures of the receiving portions 3, 3 and the decelerating portions 5, 5 of said rollers. Said bar 32, with its oppositely inclined guiding extensions 33, 33, is carried, as here shown, by arms 34, 34 attached to a rock shaft 35, and a handle 36 is provided whereby the bar is movable, at the will of an operator, either into an elevated inoperative position, as shown by the broken lines in Fig. 2, or into the lowered full line operative position, where it prevents the stock, as delivered to the receiving portions 3, 3 of the rollers, from moving onto the decelerating portions 5, 5 of said rollers. Such stock, so restrained, continues its forward longitudinal movement and is delivered ultimately by suitable conveyor rollers 37, 37 to an oppositely disposed decelerating table, consisting of bullet-shaped rollers 2', 2', here shown as of the same construction and mode of operation as the rollers 2, 2. The action of the second decelerating table in removing, unobstrusively, the velocity of the bars delivered thereto, and in delivering said bars broadside to a skew assembly table constituted by elongated rollers 6', 6' is carried out in the same manner as above described. A cooling bed 8' for individual broadside movement of the bars, as lined up at their front ends by the bumper 7', subjects said bars individually to suitable pointing, cupping and bending mechanisms 12', and thereafter the above described packing action is availed of, to assemble the bars in pack formation on conveyor rolls 17', 17', which, as here shown, run in the opposite direction from the rollers 17, 17, in order to obtain a more compact disposition of the pack cooling bed 30' to which said packs are delivered, and from which they are discharged to a weighing mechanism 31'.

Thus by the proper use of the switch bar 32, the output of the mill can be distributed, as desired, between the two duplicate sets of apparatus; it is possible in this way, after partially filling the first cooling bed 8, to deflect succeeding pieces of material to the other cooling bed 8', thereby giving an opportunity for relatively slow operation of said cooling beds, so that the material, before it reaches the pointing, cupping and bending devices, will have a chance to cool off to some extent.

I claim,

1. In the manufacture and conditioning of skelp for use in pipe making, the improvement which consists in imparting broadside travel to successively delivered pieces of the hot rolled product of a skelp bar mill, subjecting the front end of each piece in the course of said broadside travel to pointing, cupping and bending operations, and thereafter assembling said pieces in pack formation for cooling.

2. In the manufacture and conditioning of skelp for use in pipe making, the improvement which consists in substantially removing the velocity of successive pieces of skelp bar as delivered longitudinally from a mill, alining said pieces by their front ends against a fixed abutment, subjecting said alined front ends, successively, to pointing, cupping and bending operations, and finally assembling said pieces in pack formation for cooling.

3. In the manufacture and conditioning of skelp for use in pipe making, the improvement which consists in pointing, cupping and bending the front ends of successively cut-off pieces of the hot rolled stock in the course of the broadside travel of each piece across a cooling bed, and thereafter assembling said pieces in pack formation for transportation to another cooling bed.

4. The herein described method of manufacturing and conditioning skelp for use in pipe making, which consists in decelerating each piece of the hot rolled product as delivered from the mill, registering its front end, by combined longitudinal and broadside movement, against a fixed abutment, imparting to it, after such front end registration, a broadside travel, subjecting it in the course of said broadside travel to pointing, cupping and bending operations on said registered front end, and finally assembling it with a plurality of other pieces in pack formation for cooling.

5. In apparatus of the class described, means for assembling successive broadside travelling bars in pack formation, in combination with means operable individually on each bar, in the course of its broadside travel, to point, cup and bend the end thereof.

6. Apparatus for the manufacture and conditioning of skelp for use in pipe making, comprising a decelerating table for the substantial removal of velocity from successively delivered pieces of the hot rolled product of a skelp bar mill means for registering the front ends of said pieces as delivered successively from said decelerating table, mechanism for assembling said pieces in packs, and means for subjecting said registered front ends to pointing, cupping and bending operations on their way to said assembling mechanism.

7. In apparatus for the manufacture and conditioning of skelp for use in pipe making, a cooling bed whereon the individual bars, as delivered from a skelp bar mill are moved broadside, pack-forming means at the discharge end of said bed for the assemblage of said bars in pack formation, and means for subjecting said bars on their way toward said pack-forming means to pointing, cupping and bending operations on their ends.

8. Apparatus for the manufacture and conditioning of skelp for use in pipe making, comprising a decelerating roller table arranged to receive successive pieces of the hot rolled product of a skelp bar mill, means for procuring front end registration of the successive pieces as discharged from said decelerating roller table, a cooling bed on which said registered pieces are moved broadside, means operable during the sojourn of said pieces on said cooling bed to point, cup and bend the front ends of said pieces, and means for thereafter assembling said pieces in pack formation for further cooling.

9. Apparatus for the manufacture and conditioning of skelp for use in pipe making, comprising a pair of decelerating roller tables in tandem arrangement, and alined substantially with the delivery of a skelp bar mill, means operable selectively to subject successive pieces of the mill product to the action of the first of said tables, or to continue its longitudinal movement onto the second of said tables, registering means, associated with each table, to procure alinement of the front ends of successive pieces of the mill product as discharged by each table, means associated with each table for broadsiding the pieces so registered, and means operable in the course of such broadsiding to point, cup and bend the front ends of each of said pieces.

10. In apparatus of the class described, means for decelerating successive longitudinally-delivered pieces of stock, means for registering the pieces so decelerated by their front ends, means for subjecting the front ends so registered to pointing, cupping and bending operations, and means for assembling said pieces so operated upon in pack formation for cooling.

11. In the manufacture and conditioning of skelp for use in pipe making, the improvement which consists in first decelerating the successive pieces of stock as delivered longitudinally from the mill, then alining said pieces by their front ends, then subjecting said alined front ends successively to pointing, cupping and being operations, and finally assembling the pieces so operated upon in pack formation for cooling.

12. In apparatus of the class described, the combination with means for procuring the step-by-step broadside movement of a succession of bars, of means operable on each bar, in one of its periods of dwell, to point, cup and bend the end thereof, and means for thereafter continuing the broadside movement of said bar to carry it into pack formation with preceding bars.

13. In apparatus of the class described, the combination with means for procuring the step-by-step broadside movement of a succession of bars, of pointing, cupping and bending devices with which an end of each bar is registered, in one of the dwell periods between the steps of its broadside movement, and packing means operable on each bar, following the action thereon of said pointing, cupping and bending devices.

JEROME R. GEORGE.